US 6,529,337 B2

(12) United States Patent
Koyama et al.

(10) Patent No.: US 6,529,337 B2
(45) Date of Patent: Mar. 4, 2003

(54) IMAGE BLUR CORRECTION APPARATUS

(75) Inventors: Atsushi Koyama, Utsunomiya (JP); Toru Kawai, Kawasaki (JP); Ryuji Suzuki, Iwatsuki (JP); Masanori Ishikawa, Tokyo (JP); Shigeki Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/801,738

(22) Filed: Mar. 9, 2001

(65) Prior Publication Data

US 2001/0030814 A1 Oct. 18, 2001

(30) Foreign Application Priority Data

Mar. 15, 2000 (JP) ........................................ 2000-071982

(51) Int. Cl.[7] .............................................. G02B 15/14
(52) U.S. Cl. ...................................... 359/696; 359/697
(58) Field of Search ................................ 359/696, 697, 359/698, 703, 704, 706, 824, 814, 827, 828; 396/50, 55

(56) References Cited

U.S. PATENT DOCUMENTS

| 4,682,872 A | 7/1987 | Suzuki et al. ................. 396/22 |
| 4,774,538 A | 9/1988 | Kawai ........................... 396/53 |
| 4,827,296 A | 5/1989 | Haraguchi et al. ........... 396/349 |
| 4,844,586 A | 7/1989 | Suzuki et al. ................ 359/824 |
| 5,613,167 A | 3/1997 | Suzuki ........................ 396/106 |
| 5,978,598 A | * 11/1999 | Ishikawa ..................... 396/50 |
| 6,112,028 A | * 8/2000 | Okada .......................... 396/55 |
| 6,154,611 A | * 11/2000 | Washisu ....................... 396/55 |
| 6,288,854 B1 | * 9/2001 | Toyoda ........................ 359/830 |
| 6,400,902 B1 | * 6/2002 | Usui ............................ 396/55 |

* cited by examiner

*Primary Examiner*—Georgia Epps
*Assistant Examiner*—Saeed Seyrafi
(74) *Attorney, Agent, or Firm*—Fitzpatrick, Cella, Harper & Scinto

(57) ABSTRACT

An image blur correction apparatus includes a correction optical system for correcting an image blur, an actuator for driving the correction optical system, a plurality of resilient members provided on an outer periphery of the correction optical system, the resilient members being provided substantially angularly equally divided into at least three locations about an optical axis of the correction optical system, and a guide member for movably guiding the correction optical system along a direction orthogonal to the optical axis of the correction optical system. The plurality of resilient members and the guide member are disposed within substantially the same plane orthogonal to the optical axis. In a case in which the actuator does not perform the drive of the correction optical system, the plurality of resilient members hold the correction optical system substantially at a center of the optical axis.

12 Claims, 8 Drawing Sheets

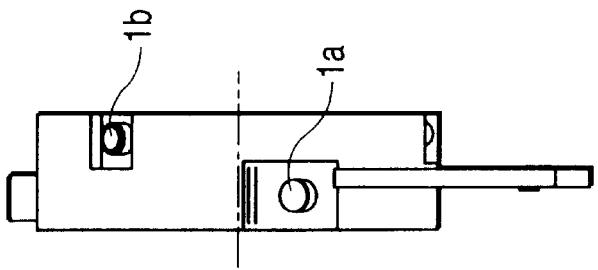
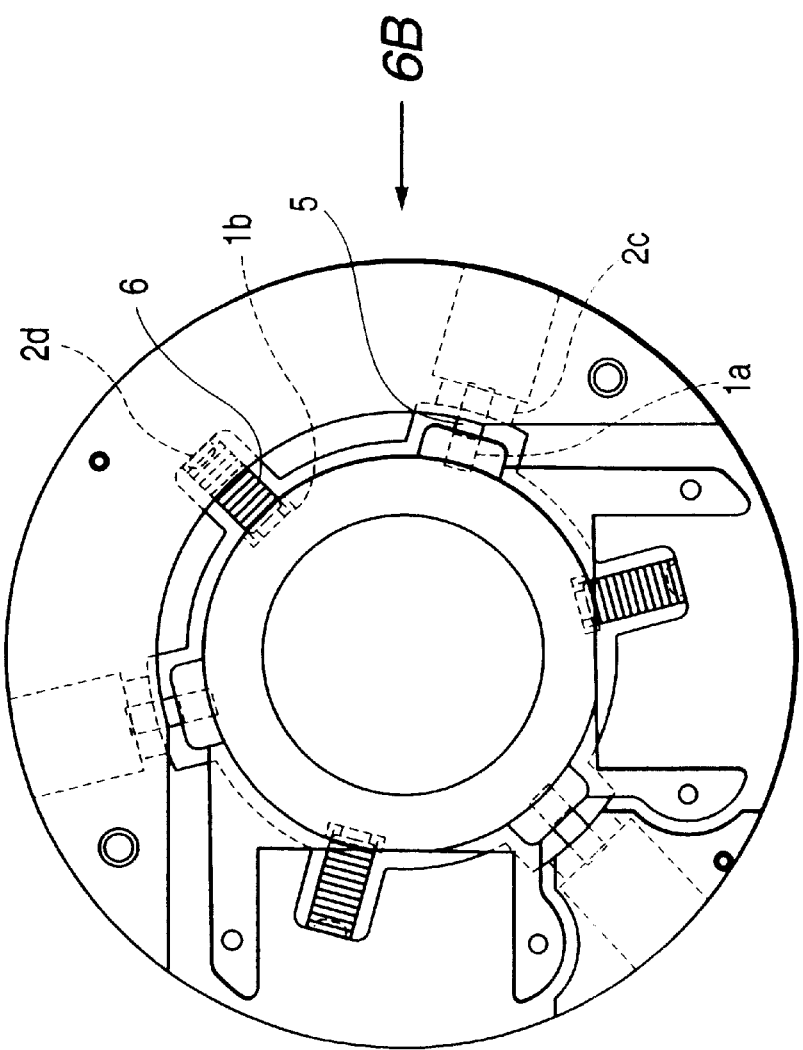

IMAGE BLUR CORRECTION APPARATUS

BACKGROUND OF THE INVENTION

1. Field of the Invention

This invention relates to improvements in the structure of an image blur correction apparatus carried on an apparatus having an image blur correction function, such as a camera.

2. Related Background Art

Present-day cameras have become automatic in all operations important to photographing, such as exposure determination or focusing and, therefore, the possibility that even a person unskilled in operating a camera will cause a failure in photographing has been drastically reduced.

Also, recently, a system for preventing hand vibration applied to a camera has been studied and the factors for inducing photographers'error in photographing have become almost null. The system for preventing hand vibration will be described briefly here. The hand vibration of a camera during photographing is usually a vibration of 1 Hz to 10 Hz as a frequency. As a basic concept for enabling a photograph free of image blur to be taken, even if such hand vibration is caused at the release point of time of a shutter, the vibration of the camera by the hand vibration must be detected and a correction optical system must be activated in conformity with the detected value of the vibration.

Accordingly, to take a photograph free of image blur even if camera vibration occurs, it becomes necessary to accurately detect the vibration of the camera and to correct the change in an optical axis caused by the hand vibration. Theoretically speaking, the detection of this vibration (camera vibration) can be accomplished by carrying, on the camera, vibration detection means provided with a vibration detection sensor for detecting acceleration, angular acceleration, angular speed, angular displacement, etc., and a calculation portion for suitably calculating the output thereof for the correction of the camera vibration. On the basis of this detected information, a correction optical system for making the photograph optical axis eccentric is driven, and image blur restraint is effected.

Here, the epitome of a vibration preventing system using the vibration detection means will be described with reference to FIG. 10 of the accompanying drawings.

FIG. 10 shows a system for restraining image blur originating from camera pitch vibration 81p and camera yaw vibration 81y indicated by arrow 81.

In FIG. 10, reference numeral 82 designates a lens barrel. Reference characters 83p and 83y denote vibration detection means for detecting camera pitch vibration and yaw vibration, respectively, and their respective vibration detection directions are indicated as 84p and 84y. Reference numeral 85 designates an image blur correction apparatus (86p and 86y denote detection elements for detecting the position of a correction optical system, and 87p and 87y designate coils for giving a thrust force to the correction optical system), and this image blur correction apparatus 85 has a position control loop formed therein, and is driven with the outputs of the vibration detection means 83p and 83y as target values, and assures the stability on the image plane 88.

Also, in the image blur correction apparatus according to the prior art, there have been made countermeasures for damage caused by the disturbance during the carrying of the correction optical system in its non-restrained state by causing the restraining operation to be performed after the termination of hand vibration correction driving or during the consumption of a power source, and a proposition for preventing photographing in the non-restrained state other than during the hand vibration correction driving, or a proposition for supporting the correction optical system by an elastic member, and holding the correction optical system at or about the optical axis during hand vibration correction non-driving.

In the present-day image blur correction apparatus as described above, means for driving the correction optical system, a guide member for making the movement in only the same plane possible, a holding member for holding the correction optical system at or substantially at the center, etc., are indispensable, and depending on the structure thereof, the apparatus has become bulky, and this has hindered the downsizing of an interchangeable lens or the like mounted on an optical apparatus having this apparatus, for example, a camera or the like.

Also, the bulkiness of the image blur correction apparatus has affected the entire optical system and has resulted in the possibility of the degree of freedom being reduced.

SUMMARY OF THE INVENTION

It is an object of the present invention to provide an apparatus for achieving the downsizing and electric power saving of an image blur correction apparatus and a camera or an optical apparatus on which the image blur correction apparatus is carried, and preventing the inclination of a correction optical system by a posture difference.

To achieve the above object, in the present invention, there is provided an image blur correction apparatus having a correction optical system for image blur correction held by a supporting member, driving means for driving the correction optical system, a resilient member for holding the correction optical system at or about an optical axis, and a guide member for holding the correction optical system movably along a plane perpendicular to the optical axis, the resilient member and the guide member being disposed in the same plane or different planes orthogonal to the optical axis. Further, the resilient member and the guide member are substantially angularly equally divided into at least three locations and provided radially.

Further objects and constructions of the present invention will become apparent from the following description of some embodiments of the invention.

BRIEF DESCRIPTION OF THE DRAWINGS

FIG. 6A is a plan view showing a state in which coils and a second yoke have been removed from the apparatus of FIG. 5, and FIG. 6B shows a side of a supporting frame shown in FIG. 6A as it is seen in the direction of arrow 6B.

DESCRIPTION OF THE PREFERRED EMBODIMENTS

Figure 1:
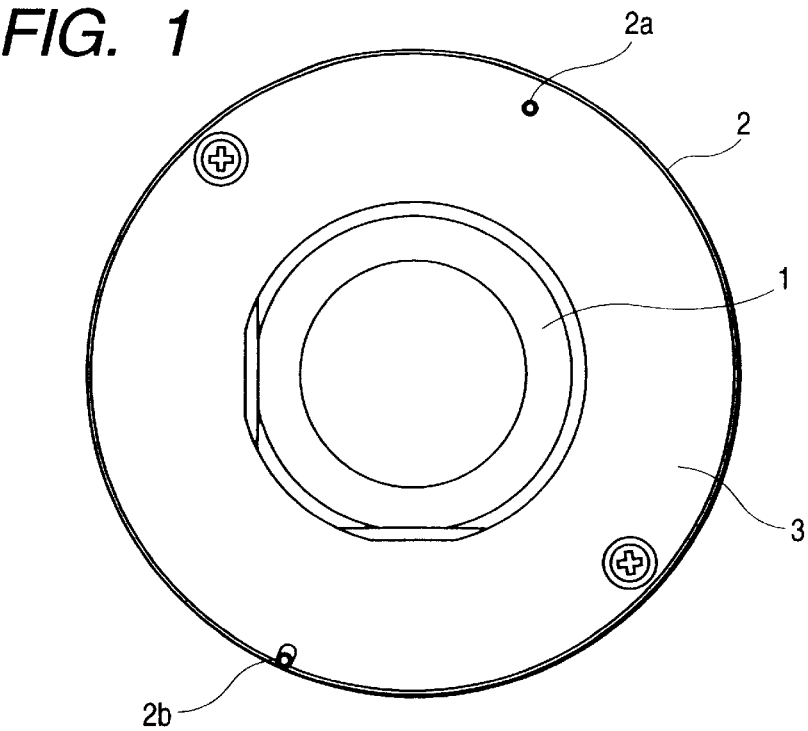
FIG. 1 is a plan view of an image blur correction apparatus according to a first embodiment of the present invention.

The present invention will hereinafter be described in detail with respect to some embodiments thereof shown in the drawings.

First Embodiment

FIGS. 1, 2, 3A and 3B show an image blur correction apparatus which is a first embodiment of the present invention, and FIG. 1 is a plan view of the image blur correction apparatus.

In FIG. 1, reference numeral 1 designates a supporting frame for holding a correction optical system (a correction lens unit), reference numeral 2 denotes a ground plate for holding the supporting frame 1, and reference numeral 3 denotes a first yoke formed of a magnetic material and positioned by projections 2a and 2b provided on the ground plate 2, and fixed to the ground plate 2 by screws or the like.

Figure 2:
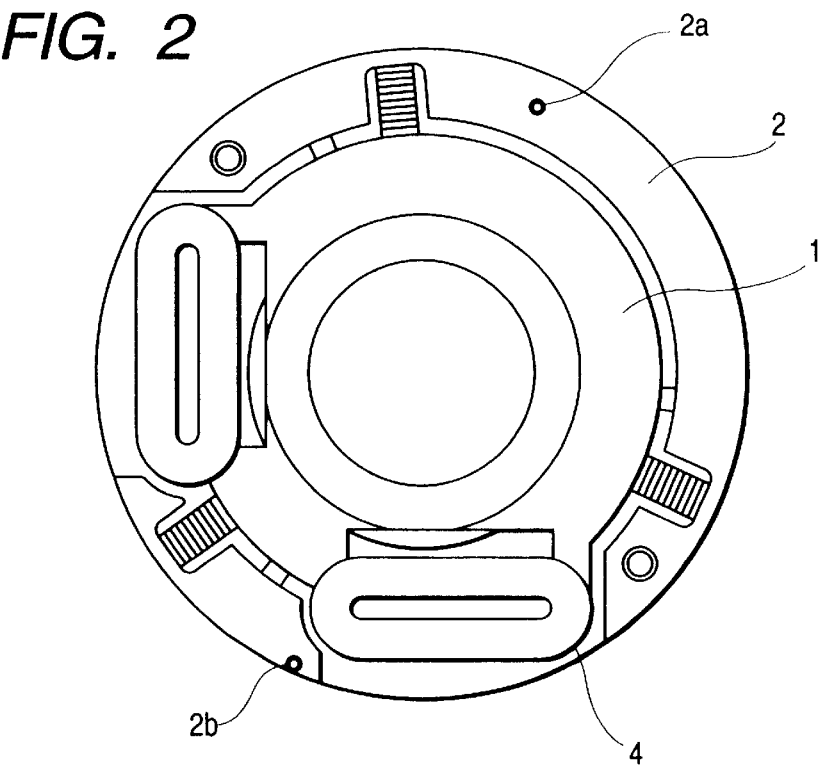
FIG. 2 is a plan view showing the image blur correction apparatus of FIG. 1 after removing a first yoke.

FIG. 2 is a plan view of the image blur correction apparatus of FIG. 1 after removing the first yoke 3.

In FIG. 2, reference numeral 4 denotes winding coils fixed to the supporting frame 1. Permanent magnets, not shown, are magnetically attracted and fixed to the locations on the first yoke 3 which are opposed to the coils. Also, a second yoke, not shown, which is a magnetic member, is fixed onto the ground plate 2 on the back side of the winding coils 4, and a conventional closed magnetic circuit is formed between the first yoke 3 and the permanent magnets, and the winding coils 4 fixed to the supporting frame provided in this closed magnetic circuit are electrically energized to thereby generate a thrust force, whereby the supporting frame 1 becomes capable of being driven.

Figure 3:
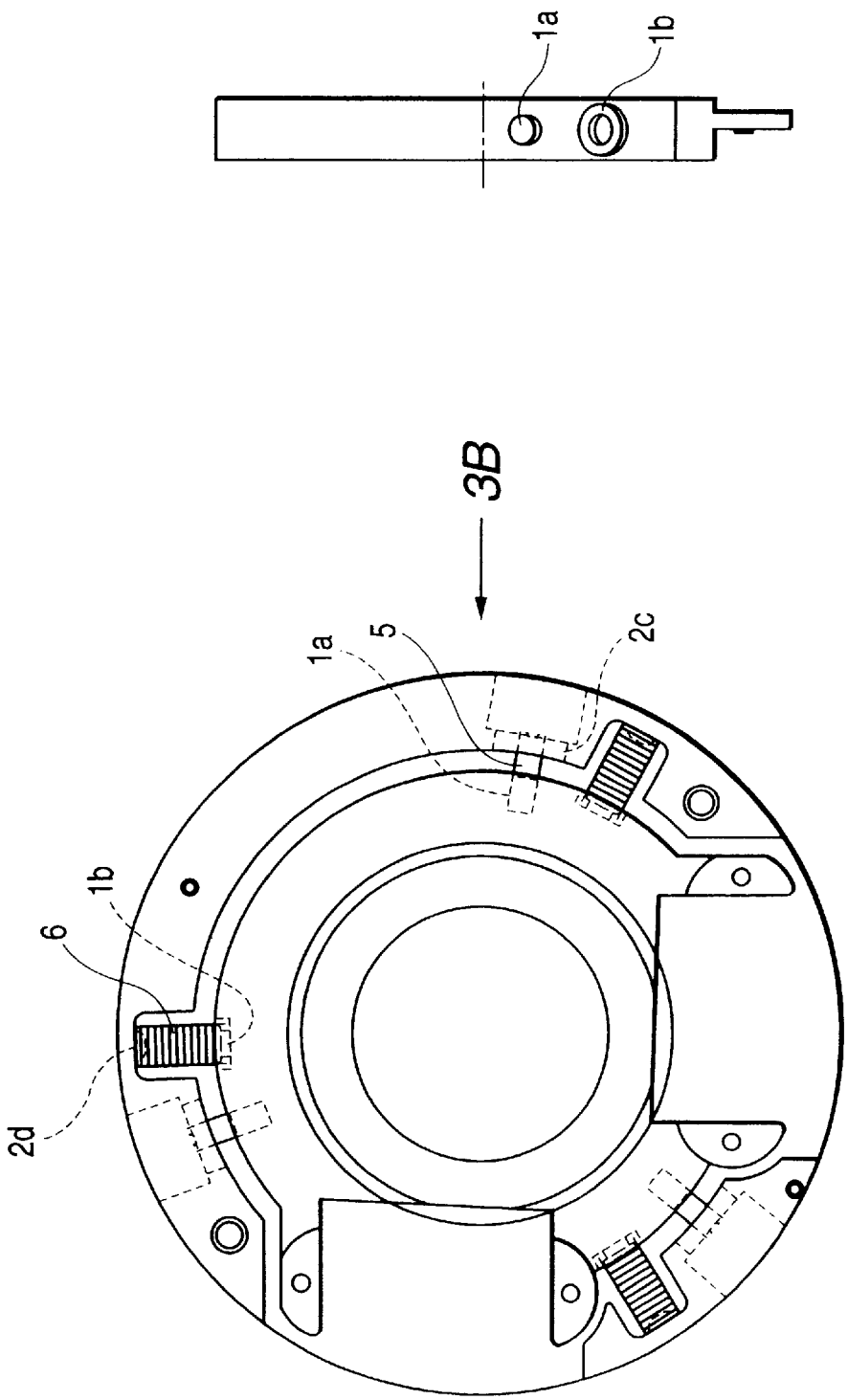
FIG. 3A is a plan view showing a state in which coils and a second yoke have been removed from the apparatus of FIG. 2.
FIG. 3B shows a side of a supporting frame shown in FIG. 3A as it is seen in the direction of arrow 3B.

FIG. 3A is a plan view showing the image blur correction apparatus of FIG. 2 after removing the winding coils and the second yoke, not shown, therefrom.

In FIG. 3A, reference numeral 5 designates shift pins each having one end thereof forcibly inserted into respective holes in the supporting frame 1 and having the other end thereof inserted into respective slots 2c formed in the ground plate 2, and these shift pins 5 are provided radially at three locations substantially equally divided by 120° about an optical axis. Also, the slots 2c extend in the direction of a plane orthogonal to the optical axis, whereby the supporting frame 1 is regulated in its movement in the direction of the optical axis relative to the ground plate 2, and is movable in the plane orthogonal to the optical axis.

Reference numeral 6 denotes compression springs for resiliently supporting the supporting frame 1 relative to the ground plate 2, and one end of each of the compression springs 6 is positioned by a projection 1b provided on the supporting frame 1 and the other end thereof is positioned by a projection 2d provided on the ground plate 2, and these compression springs 6 are provided at three locations substantially equally divided by 120° about the optical axis.

The projections 1b and the projections 2d protrude radially about the optical axis and are provided so as to be opposed to each other on the same straight line, and thus, the compression springs 6 are also disposed radially about the optical axis. Also, when the winding coils 4 are not electrically energized, the supporting frame 1 is held substantially about the optical axis by the compression springs 6.

FIG. 3B is a side view of the supporting frame 1 as it is seen in the direction of an arrow in FIG. 3A.

In FIG. 3B, the holes 1a into which the shift pins 5 are forcibly inserted and the projections 1b in which the compression springs 6 are inserted are provided substantially in the same plane orthogonal to the optical axis as shown, and thus, the shift pins 5 and the compression springs 6 are also provided substantially in the same plane orthogonal to the optical axis. Thus, it becomes possible to make the supporting frame 1 thinner and lighter in weight, and further, the downsizing of the image blur correction apparatus becomes possible.

Second Embodiment

Figure 4:
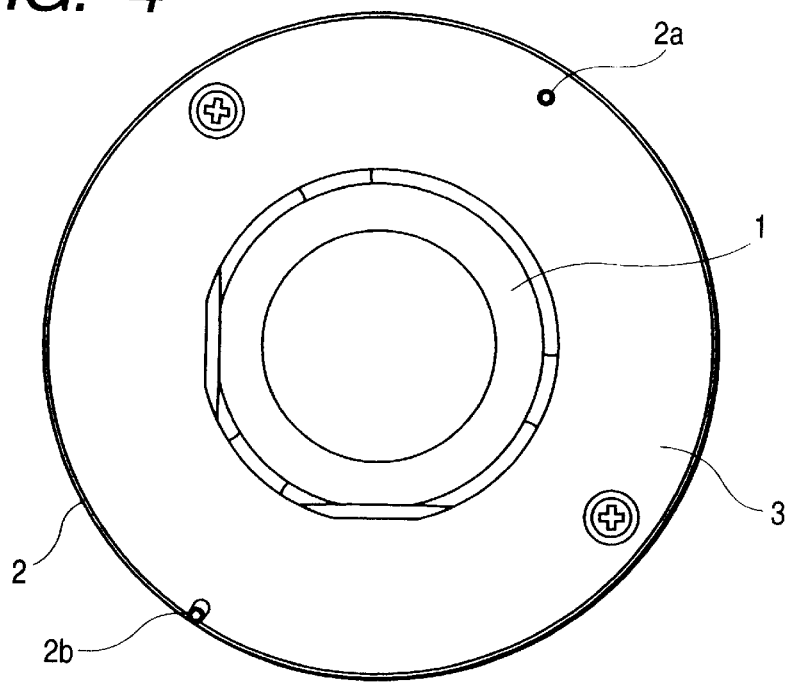
FIG. 4 is a plan view of an image blur correction apparatus according to a second embodiment of the present invention.

FIGS. 4, 5, 6A and 6B show an image blur correction apparatus which is a second embodiment of the present invention, and FIG. 4 is a plan view of the image blur correction apparatus.

In FIG. 4, reference numeral 1 designates a supporting frame for holding a correction optical system, reference numeral 2 denotes a ground plate for holding the supporting frame 1, and reference numeral 3 designates a first yoke formed of a magnetic material and positioned by projections 2a and 2b provided on the ground plate 2, and fixed to the ground plate 2 by screws or the like.

Figure 5:
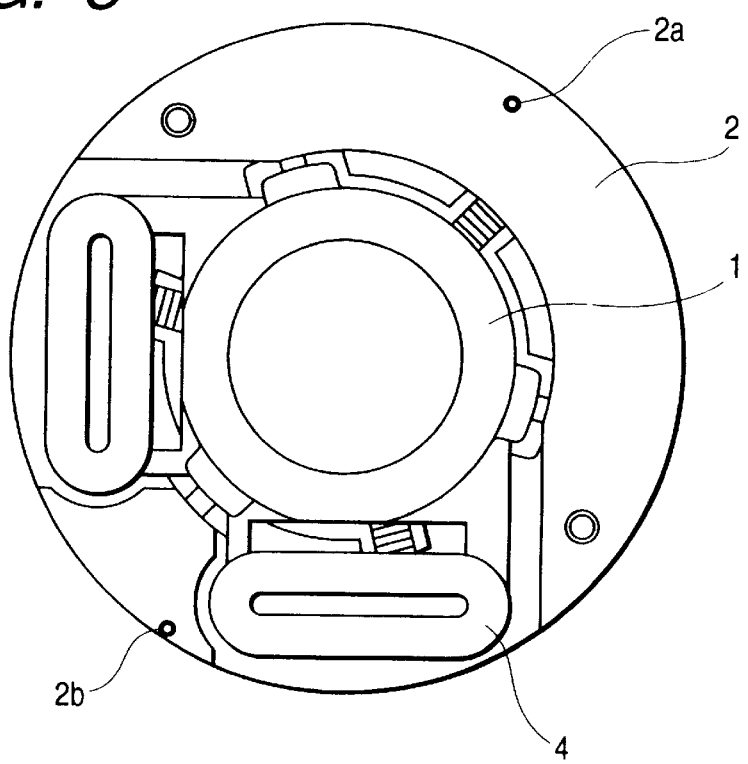
FIG. 5 is a plan view showing the image blur correction apparatus of FIG. 4 after removing a first yoke.

FIG. 5 is a plan view showing the image blur correction apparatus of FIG. 4 after removing the first yoke 3.

In FIG. 5, reference numeral 4 denotes winding coils, each of which comprises a coil portion and a bobbin, and is fixed to the supporting frame 1. Also, permanent magnets, not shown, are magnetically attracted and fixed to the locations on the first yoke 3 which are opposed to the coils. Also, a second yoke, not shown, which is a magnetic member, is fixed onto the ground plate 2 on the back side of the winding coils 4, and a conventional closed magnetic circuit is formed between the first yoke 3 and the permanent magnets, and the winding coils 4 provided in this closed magnetic circuit and fixed to the supporting frame 1 are electrically energized to thereby generate a thrust force, whereby the supporting frame 1 becomes capable of being driven.

FIG. 6A is a plan view showing the image blur correction apparatus of FIG. 5 after removing the coils 4 of the second yoke.

In FIG. 6A, reference numeral 5 designates shift pins each having one end thereof forcibly inserted into respective holes 1a in the supporting frame 1 and having the other end inserted in respective slots 2c formed in the ground plate 2, and these shift pins 5 are provided radially at three locations substantially equally divided by 120° about an optical axis and in the same plane orthogonal to the optical axis. Also, the slots 2c extend in the direction of a plane orthogonal to the optical axis, whereby the supporting frame 1 is regulated in its movement in the direction of the optical axis relative to the ground plate 2, and is movable in the plane orthogonal to the optical axis.

Reference numeral 6 denotes compression springs for resiliently supporting the supporting frame 1 relative to the ground plate 2, and one end of each of the compression springs 6 is positioned by a projection 1b provided on the supporting frame 1 and the other end thereof is positioned by a projection 2d provided on the ground plate 2, and these compression springs 6 are provided at three locations substantially equally divided by 120° about the optical axis and in the same plane orthogonal to the optical axis.

The projections 1b and the projections 2d protrude radially about the optical axis and are provided so as to be opposed to each other on the same straight line and thus, the compression springs 6 are also disposed radially about the optical axis. Also, when the winding coils 4 are not electrically energized, the supporting frame 1 is held at or about the optical axis by the compression springs 6.

FIG. 6B is a side view of the supporting frame 1 as it is seen in the direction of arrow 6B in FIG. 6A.

The holes 1a into which the shift pins 5 are forcibly inserted and the projections 1b in which the compression springs 6 are inserted are provided in different planes orthogonal to the optical axis, and the smaller diameter and lighter weight of the supporting frame 1 become possible and further, the downsizing of the image blur correction apparatus becomes possible.

Third Embodiment

Figure 7:
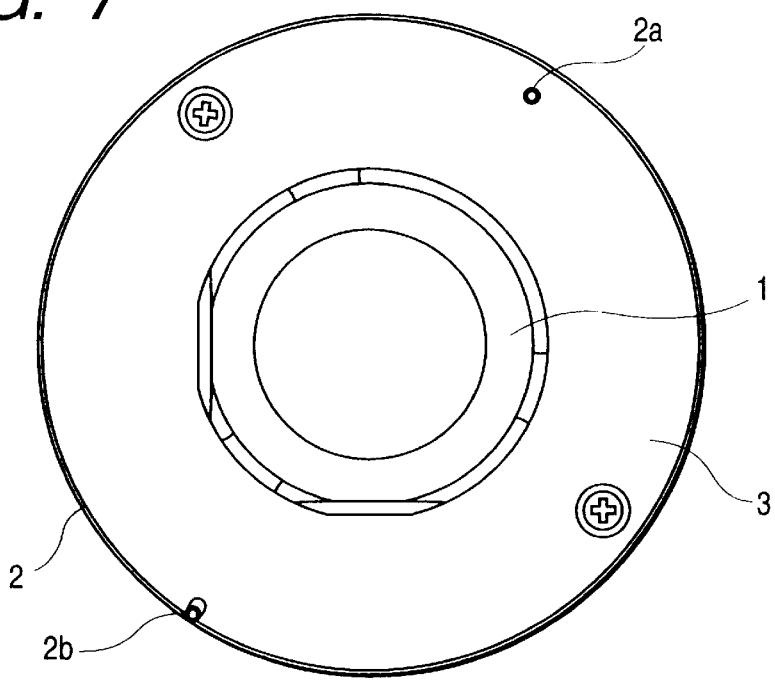
FIG. 7 is a plan view of an image blur correction apparatus according to a third embodiment of the present invention.

FIGS. 7, 8, 9A and 9B show an image blur correction apparatus which is a third embodiment of the present invention, and FIG. 7 is a plan view of the image blur correction apparatus.

In FIG. 7, reference numeral 1 designates a supporting frame for holding a correction optical system, reference numeral 2 denotes a ground plate for holding the supporting frame, and reference numeral 3 designates a first yoke formed of a magnetic material and positioned by projections 2a and 2b provided on the ground plate 2, and fixed to the ground plate 2 by screws or the like.

Figure 8:
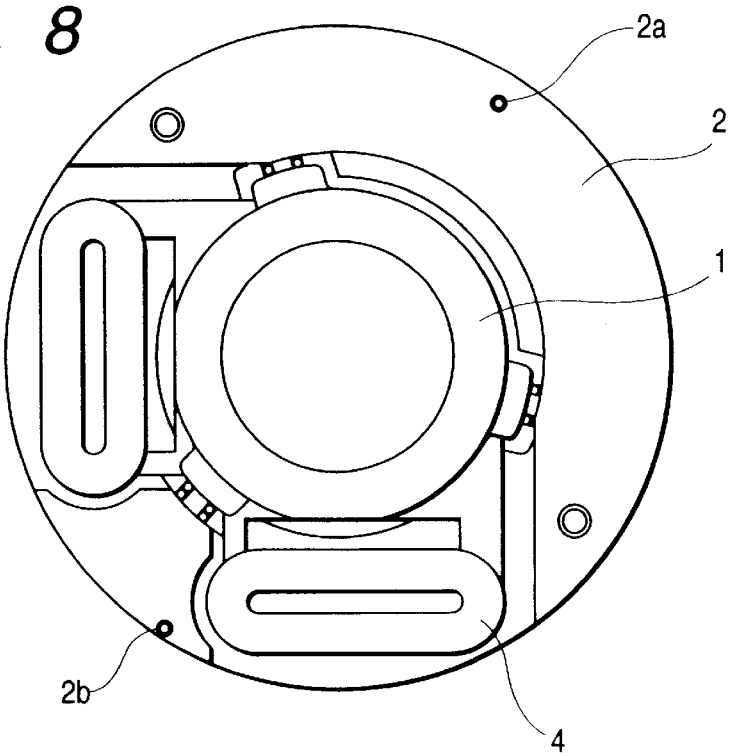
FIG. 8 is a plan view showing the apparatus of FIG. 7 after removing a first yoke.

FIG. 8 is a plan view showing the image blur correction apparatus of FIG. 7 after removing the first yoke 3.

In FIG. 8, reference numeral 4 denotes winding coils, each of which comprises a coil portion and a bobbin, and is fixed to the supporting frame 1. Also, permanent magnets, not shown, are magnetically attracted and fixed to the locations on the first yoke 3 which are opposed to the coils. Also, a second yoke, not shown, which is a magnetic member, is fixed onto the ground plate 2 on the back side of the winding coils 4, and a conventional closed magnetic circuit is formed between the first yoke 3 and the permanent magnets, and the winding coils 4 provided in this closed magnetic circuit and fixed to the supporting frame 1 are electrically energized to thereby generate a thrust force, whereby the supporting frame 1 becomes capable of being driven.

Figure 9:
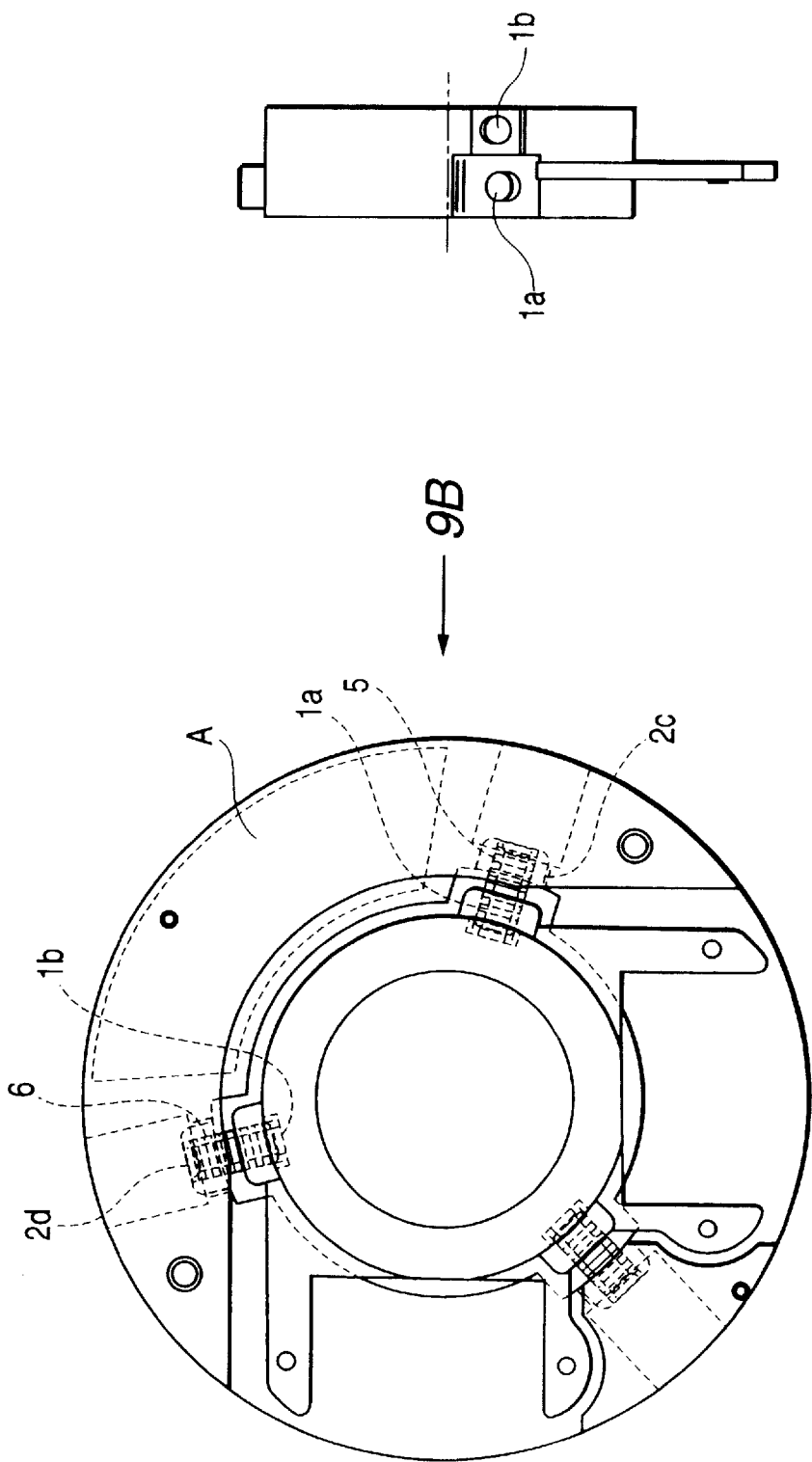
FIG. 9A is a plan view showing a state in which coils and a second yoke have been removed from the apparatus of FIG. 8.
FIG. 9B shows a side of a supporting frame shown in FIG. 9A as it is seen in the direction of arrow 9B.
Figure 10:
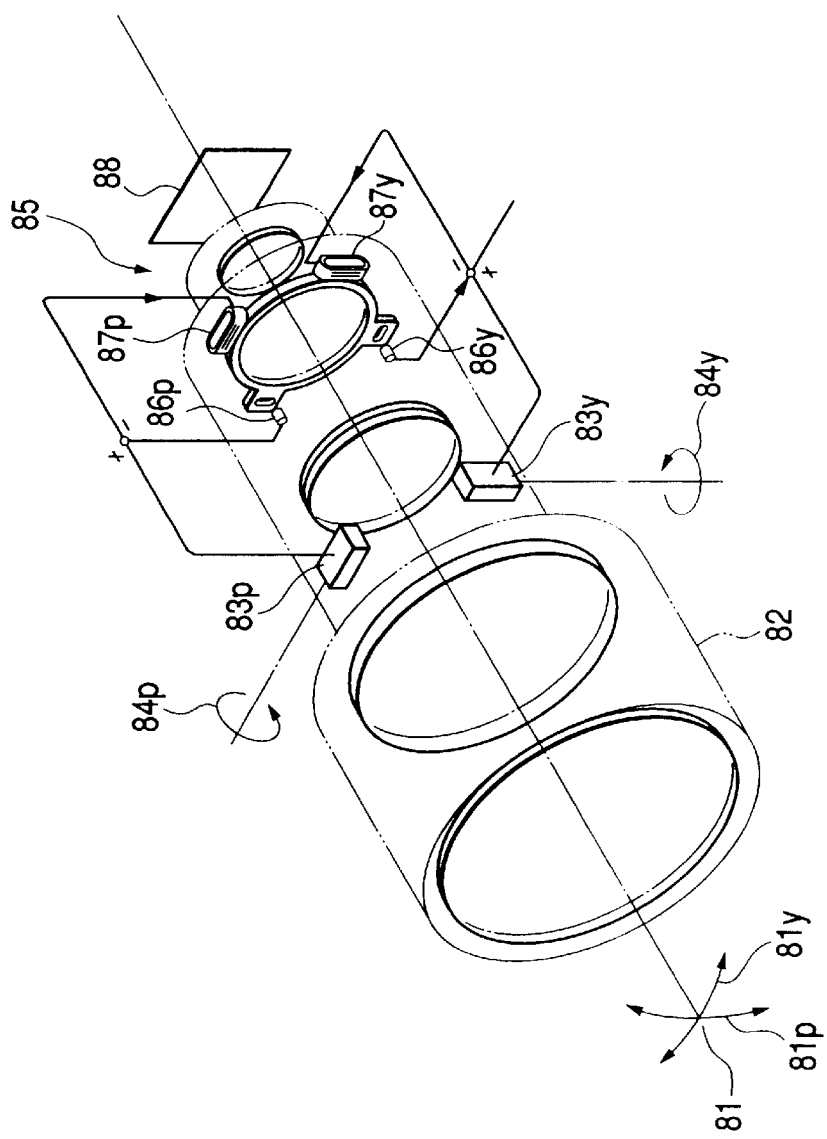
FIG. 10 is a schematic perspective view showing an example of a system provided with an image blur correction apparatus.

FIG. 9A is a plan view showing the image blur correction apparatus of FIG. 8 after removing the winding coils 4 and the second yoke.

In FIG. 9A, reference numeral 5 designates shift pins each having one end thereof forcibly inserted into respective holes 1a in the supporting frame 1 and having the other end inserted in respective slots 2c formed in the ground plate 2, and these shift pins 5 are provided radially at three locations substantially equally divided by 120° about an optical axis and in the same plane orthogonal to the optical axis. Also, the slots 2c extend in the direction of a plane orthogonal to the optical axis, whereby the supporting frame 1 is regulated in its movement in the direction of the optical axis relative to the ground plate 2, and is movable in a plane orthogonal to the optical axis.

Reference numeral 6 denotes compression springs for resiliently supporting the supporting frame 1 relative to the ground plate 2, and one end of each of the compression springs 6 is positioned by a projection 1b provided on the supporting frame 1 and the end thereof is positioned by a projection 2d provided on the ground plate 2, and these compression springs 6 are provided at three locations substantially equally divided by 120° about the optical axis and in the same plane orthogonal to the optical axis.

The projections 1b and the projections 2d protrude radially about the optical axis and are provided so as to be opposed to each other on the same straight line and thus, the compression springs 6 are also disposed radially about the optical axis. Also, when the winding coils 4 are not electrically energized, the supporting frame 1 is held at our about the optical axis by the compression springs 6.

FIG. 9B is a side view of the supporting frame 1 as it is seen in the direction of arrow 9B in FIG. 9A.

The holes 1a into which the shaft pins 5 are forcibly inserted and the projections 2d in which the compression springs 6 are inserted are provided in different planes orthogonal to the optical axis as shown and thus, the shift pins 5 and the compression springs 6 are also provided in different planes orthogonal to the optical axis, and the smaller diameter and lighter weight of the supporting frame 1 become possible and further, the downsizing of the image blur correction apparatus becomes possible.

Further, the holes 1a into which the shift pins 5 are forcibly inserted and the projections 2d in which the compression springs 6 are inserted are provided in the same angular phase as shown. Thus, the shift pins 5 and the compression springs 6 are also provided in the same angular phase, and it becomes possible to secure a space as indicated by a portion A in FIG. 9A. If, for example, the position detecting means of the correction optical system is disposed in this space A, more highly accurate control of the correction optical system can be obtained.

Figure 11:
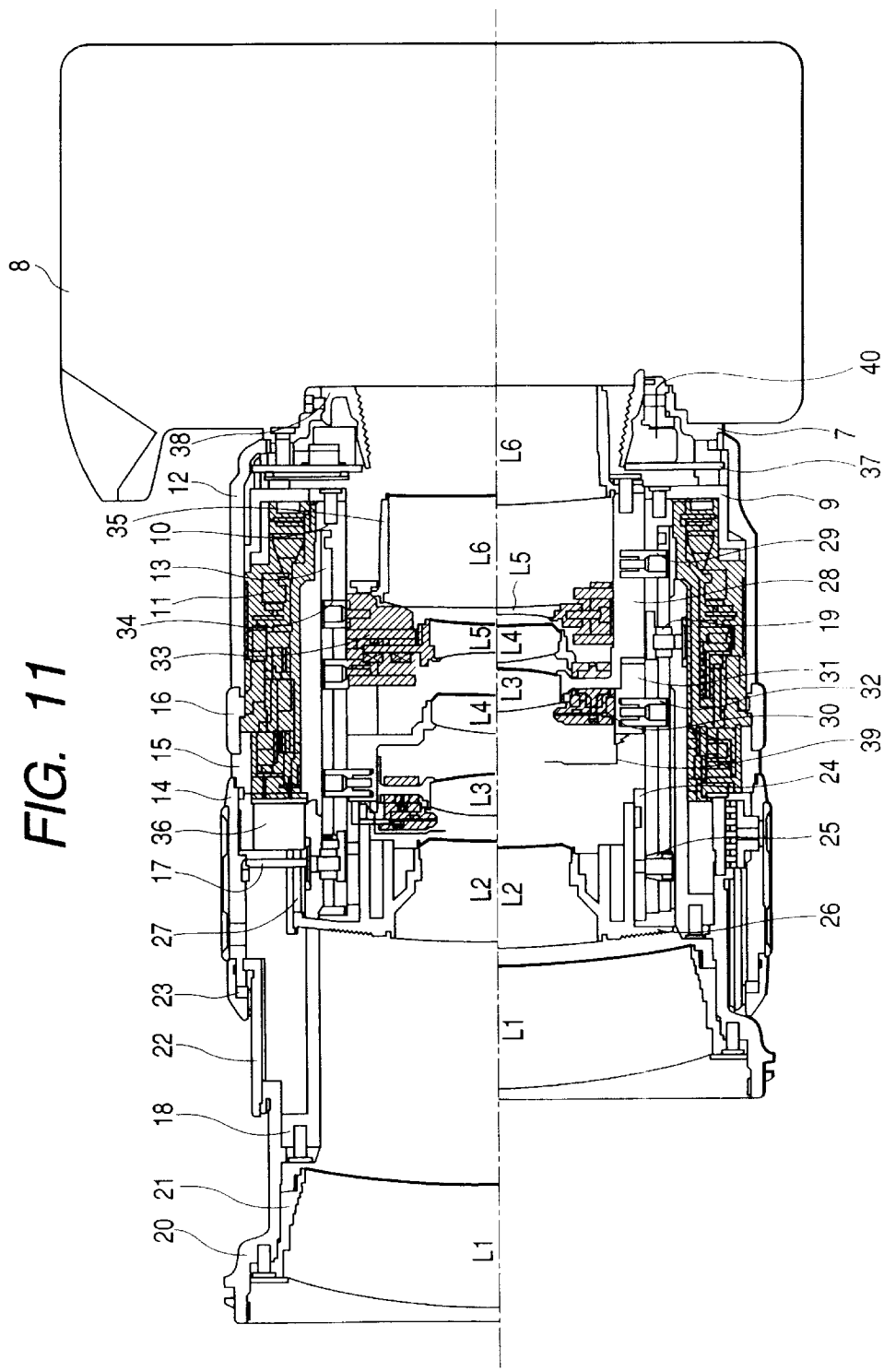
FIG. 11 is a plan view of an interchangeable lens for a single-lens reflex camera carrying the image blur correction apparatus of the present invention thereon and the camera.

FIG. 11 shows the construction of an interchangeable lens barrel (optical apparatus) for a single-lens reflex camera carrying thereon the image blur correction apparatus which is the first, the second and the third embodiment of the present invention.

This lens barrel is a zoom lens of a six-unit construction having a first lens unit L1 to a sixth lens unit L6, and is such that by zooming, all the lens units are moved in the direction of the optical axis and by focusing, the second lens unit L2 is moved in the direction of the optical axis.

In FIG. 11, reference numeral 7 designates a mount having a pawl portion to be bayonet-coupled to the main body 8 (the details of which are omitted) of the single-lens reflex camera, and coupled to a fixed cylinder 9 by screws or the like.

A guide cylinder 10 is coupled to the fixed cylinder 9 by screws, and a focusing unit 11 using a vibration type motor is fixed to the guide cylinder 10. An armor ring 12 is also fixed to the fixed cylinder 9.

A cam cylinder 13 is bayonet-coupled and fitted to the outer periphery of the guide cylinder 10 and is only rotatable about the optical axis.

Reference numeral 14 denotes a zoom ring which is bayonet-coupled to a communication ring 15 fixed to the focusing unit 11 and is only rotatable about the optical axis. Between the armor ring 12 and the communication ring 15, a focusing ring 16 is held for rotation about the optical axis. Also, the cam cylinder 13 and the zoom ring 14 are connected together by a zoom key 17 and are rotated integrally with each other.

Reference numeral 18 designates a rectilinear cylinder fixed to a rectilinear key 19 engaged with a rectilinear groove 10a formed in the guide cylinder 10 and extending in the direction of the optical axis and a cam groove 13a formed in the cam cylinder 13, and the rectilinear cylinder 18 is moved in the direction of the optical axis by rotating operation of the zoom ring 14.

A filter frame 20 is attached to the fore end of the rectilinear cylinder 18, and a first lens holding frame 21 for holding the first lens unit L1 is fixed to the filter frame 20. A male helicoid is provided on the rear end portion of the filter frame 20 and is threadably engaged with a female helicoid provided on the inner periphery of an intermediate cylinder 22.

Also, a convex portion 22a provided on the outer periphery of the intermediate cylinder 22 is in engagement with a rectilinear groove 14a formed in the inner periphery of the zoom ring 14.

Reference numeral 23 denotes a name ring which is a slip-preventing member for the intermediate cylinder 22, and the name or the like of the lens is printed thereon.

Reference numeral 24 designates an inner cam cylinder to which is coupled a roller 25 engaged with a cam groove 10b formed in the guide cylinder 10 and a rectilinear groove 13b formed in the cam cylinder 13, and the inner cam cylinder 24 is rotatably fitted to the inner periphery of the guide cylinder 10. Therefore, the inner cam cylinder 24 is moved in the direction of the optical system while being rotated by the rotating operation of the zoom ring 14.

Reference numeral 26 denotes a second lens holding frame for holding the second lens unit L2, and a convex portion engaged with a cam groove formed in the inner cam cylinder 24 is provided on the outer periphery of the second lens holding frame 26.

Reference numeral 27 designates a focusing key which outputs the amount of rotation of the vibration type motor in the focusing unit 11 and the amount of rotation of a manual ring 16. The distal end portion of the focusing key 27 is in engagement with an arm portion 26a provided on the second lens holding frame 26, and rotates the second lens holding frame 26 to thereby effect focusing, and during zooming, it performs the role as a rotation regulating member for the second lens holding frame 26.

Reference numeral 28 denotes a third lens holding frame for holding the third lens unit L3, and this third lens holding frame 28 is fitted to the inner periphery of the guide cylinder 10 movably in the direction of the optical axis. Also, the third lens holding frame 28 has an arm portion extending in the direction of the optical axis, and a roller 29, which is engaged with a rectilinear groove 10a formed in the guide cylinder 10 and extending in the direction of the optical axis and a cam groove 13c formed in the cam cylinder 13, is coupled to the arm portion. Further, the third lens holding frame 28 is moved in the direction of the optical axis by zooming.

Reference numeral 30 designates an electromagnetic stop unit fixed to the fore end of the third lens holding frame 28.

Reference numeral 31 denotes a fourth lens holding frame for holding the fourth lens unit L4, and the fourth lens holding frame 31 is rotatably fitted to the inner periphery of the guide cylinder 10 so as to evade the arm portion of the third lens holding frame 28. A roller 32 engaged with a rectilinear groove 10c formed in the guide cylinder 10 and a cam groove 13d formed in the cam cylinder 13 is coupled to the fourth lens holding frame 31 and the fourth lens holding frame 31 is moved in the direction of the optical axis by zooming.

Reference numeral 33 designates the image blur correction apparatus which is the first, the second and the third embodiment holding the fifth lens unit L5, and the image blur correction apparatus 33 is rotatably fitted to the inner periphery of the guide cylinder 10 so as to evade the arm portion of the third lens holding frame 28. A roller 34 engaged with a rectilinear groove 10c formed in the guide cylinder 10 and a cam groove 13e formed in the cam cylinder 13 is coupled to the image blur correction apparatus 33 and the image blur correction apparatus is moved in the direction of the optical axis by zooming.

Reference numeral 35 denotes a sixth lens holding frame for holding the sixth lens unit L6, and the sixth lens holding frame 35 is fixed to the rear end portion of the third lens holding frame 28 by screws or the like, and is moved in the direction of the optical axis integrally with the third lens holding frame 28 by zooming.

Reference numeral 36 designates a vibration gyro which is vibration detecting means for detecting vibration such as hand vibration, and the vibration gyro is fixed forwardly of the communication ring 15.

Reference numeral 37 denotes a main substrate fixed to the fixed cylinder 9. The main substrate 37 is electrically connected to the focusing unit 11, the electromagnetic stop unit 30, the image blur correction apparatus 33, the vibration gyro 36, etc., through a flexible printed substrate, and electronic parts for effecting various kinds of control are mounted thereon.

Reference numeral 38 designates a back lid which is resiliently coupled to the mount 7 and cuts harmful lights.

Reference numeral 39 denotes a movable stop which is fixed to the fourth lens holding frame 31 and cuts the harmful lights as does the back lid 38.

Reference numeral 40 designates a contact block fixed to the mount 7. and electrically connected to the main substrate 37. This contact block 40 is provided to effect communication with the main body 8 of the camera and to receive the supply of a power source from the main body side of the camera.

Also, while FIG. 11, has been described with respect to an interchangeable single-lens reflex camera and lens, this may, of course, be a camera of a type comprising a camera and a lens integral with each other.

According to the above-described embodiments, the compression springs 6 for holding the correction optical system substantially at the center of the optical axis and the shift pins 5 for movably holding the correction optical system (supporting frame 1) along a plane are disposed as shown in FIGS. 3A and 3B, FIGS. 6A and 6B or FIGS. 9A and 9B, whereby it is possible to realizeythe downsizing of the image blur correction apparatus and further an apparatus such as a camera on which this apparatus is carried by the thinning (FIGS. 3A and 3B) or the reduction in the diameter (FIGS. 6A and 6B, and FIGS. 9A and 9B) of the supporting frame 1 holding the correction optical system.

Also, consumed electric power can be decreased and energy saving becomes possible by the lighter weight resulting from the thinning or the reduction in the diameter of the lens barrel.

Also, as shown in FIG. 9A, the shift pins 5 and the compression springs 6 are provided in the same angular phase, whereby it becomes possible to secure the space A, and, for example, the position detecting means for the correction optical system is disposed in this space A, whereby more highly accurate control of the correction optical system can be obtained.

Also, as shown in FIG. 3A or FIG. 6A, the shift pins 5 and the compression springs 6 are provided in different angular phases, whereby space efficiency can be improved and it becomes possible to improve the balance of the apparatus.

Also, the shift pins 5 are provided radially at three locations substantially equally divided by 120° about the optical axis and in the same plane orthogonal to the optical axis and, therefore, it becomes possible to restrain the inclination of the correction optical system relative to the optical axis, and to restrain the variation in the performance of the apparatus and an instrument such as a camera on which the apparatus is carried by a posture difference.

Also, the compression springs 6 are provided at three locations substantially equally divided by 120° about the optical axis and in the same plane orthogonal to the optical axis and, therefore, it becomes possible to restrain the variation in the performance of the apparatus and an instrument such as a camera on which the apparatus is carried by a posture difference.

Modification

In the above-described embodiments, the compression springs 6 which are resilient members for holding the correction optical system substantially at the center of the optical axis and the shift pins which are guide members for holding the supporting frame 1 movably along a plane have been described as being disposed at three locations, but even if they are disposed at more than three locations, a similar effect can, of course, be obtained if the more than three locations are substantially angularly equally divided.

As described above, according to the present invention, there can be provided an image blur correction apparatus which can achieve the downsizing and electric power saving of the apparatus and an optical apparatus on which the apparatus is carried.

Also, according to the present invention, there can be provided an image blur correction apparatus which can restrain the variation in the performance of the apparatus and an optical apparatus on which the apparatus is carried by a posture difference.

Also, according to the present invention, there can be provided an image blur correction apparatus which can improve space efficiency and can improve the balance of the apparatus.

Also, according to the present invention, there can be provided an image blur correction apparatus which can secure a space and enables means for improving the image blur correcting function to be disposed in the space.

What is claimed is:

1. An image blur correction apparatus comprising:
   a correction optical system for correcting an image blur;
   an actuator for driving said correction optical system;
   a plurality of resilient members provided on an outer periphery of said correction optical system, said resilient members being provided substantially angularly equally divided into at least three locations about an optical axis of said correction optical system; and
   a guide member for movably guiding said correction optical system along a direction orthogonal to the optical axis of said correction optical system,
   wherein said plurality of resilient members and said guide member are disposed within substantially the same plane orthogonal to the optical axis, and
   wherein in a case that said actuator does not perform the drive of said correction optical system, said plurality of resilient members hold said correction optical system substantially at a center of the optical axis.

2. An image blur correction apparatus according to claim 1, wherein said guide member is provided substantially angularly equally divided into at least three locations about the optical axis of said correction optical system.

3. An image blur correction apparatus according to claim 1, wherein said resilient members include compression springs and said compression springs force said correction optical system to the center of the optical axis.

4. An image blur correction apparatus comprising:
   a correction optical system for correcting an image blur;
   an actuator for driving said correction optical system;
   a plurality of resilient members provided on an outer periphery of said correction optical system, said resilient members being provided substantially angularly equally divided into at least three locations about an optical axis of said correction optical system; and
   a guide member for movably guiding said correction optical system along a direction orthogonal to the optical axis of said correction optical system;
   wherein said plurality of resilient members are disposed within a first plane orthogonal to the optical axis, and said guide member is disposed within a second plane orthogonal to the optical axis and shifted from the first plane along the direction of the optical axis,
   and wherein in a case that said actuator does not perform the drive of said correction optical system, said plurality of resilient members hold said correction optical system substantially at a center of the optical axis.

5. An image blur correction apparatus according to claim 4, wherein said guide member is provided substantially angularly equally divided into at least three locations about the optical axis of said correction optical system.

6. An image blur correction apparatus according to claim 4, wherein said plurality of the resilient members and said guide member are disposed at locations of which phases are different from each other in the direction of the optical axis.

7. An image blur correction apparatus according to claim 4, wherein said plurality of the resilient members and said guide member are disposed at locations of which phases are equal to each other in the direction of the optical axis.

8. An image blur correction apparatus according to claim 4, wherein said resilient members include compression springs, and said compression springs force said correction optical system to the center of the optical axis.

9. A lens apparatus comprising:
   an image taking optical system comprising a correction optical system for correcting an image blur;
   an actuator for driving said correction optical system;
   a plurality of resilient members provided on an outer periphery of said correction optical system, said resilient members being provided substantially angularly equally divided into at least three locations about an optical axis of said correction optical system; and a guide member for movably guiding said correction optical system along a direction orthogonal to the optical axis of said correction optical system, wherein said plurality of resilient members and said guide member are disposed within substantially the same plane orthogonal to the optical axis, and wherein in a case that said actuator does not perform the drive of said correction optical system, said plurality of resilient members hold said correction optical system substantially at a center of the optical axis.

10. A lens apparatus comprising:

an image taking optical system including a correction optical system for correcting an image blur;

an actuator for driving said correction optical system;

a plurality of resilient members provided in an outer periphery of said correction optical system, said resilient members being provided substantially angularly equally divided into at last three locations about an optical axis of said correction optical system; and a guide member for movably guiding said correction optical system along a direction orthogonal to the optical axis of said correction optical system, wherein said plurality of resilient members are disposed within a first plane orthogonal to the optical axis, and said guide member is disposed within a second plane orthogonal to the optical axis and shifted from the first plane along the direction of the optical axis, and wherein in a case that said actuator does not perform the drive of said correction optical system, said plurality of resilient members hold said correction optical system substantially at a center of the optical axis.

11. An optical system including an interchangeable lens and a camera to which said interchangeable lens is loaded and which obtains image information through the interchangeable lens, said system comprising:

an image taking optical system comprising a correction optical system for correcting an image blur;

an actuator for driving said correction optical system;

a plurality of resilient members provided on an outer periphery of said correction optical system, said resilient members being provided substantially angularly equally divided into at least three locations about an optical axis if said correction optical system; and a guide member for movably guiding said correction optical system along a directional orthogonal to the optical axis of said correction optical system, wherein said plurality of resilient members and said guide member are disposed within substantially the same plane orthogonal to the optical axis, and wherein in a case that said actuator does not perform the drive of said correction optical system, said plurality of resilient members hold said correction optical system substantially at a center of the optical axis.

12. An optical system including an interchangeable lens and a camera to which said interchangeable lens is loaded and which obtains image information through said interchangeable lens, said system comprising:

an image taking optical system including a correction optical system for correcting an image blur;

an actuator for driving said correction optical system;

a plurality of resilient members provided on an outer periphery of said correction optical system, said resilient members being provided substantially angularly equally divided into at least three locations about an optical axis of said correction optical system; and a guide member for movably guiding said correction optical system along a direction orthogonal to the optical axis of said correction optical system, wherein said plurality of resilient members are disposed within a first plane orthogonal to the optical axis, and said guide member is disposed within a second plane orthogonal to the optical axis and shifted from said first plane along the direction of the optical axis, and wherein in a case that said actuator does not perform the drive of said correction optical system, said plurality of resilient members hold said correction optical system substantially at a center of the optical axis.

* * * * *

UNITED STATES PATENT AND TRADEMARK OFFICE
CERTIFICATE OF CORRECTION

PATENT NO.   : 6,529,337 B2
DATED        : March 4, 2003
INVENTOR(S)  : Atsushi Koyama et al.

It is certified that error appears in the above-identified patent and that said Letters Patent is hereby corrected as shown below:

Column 6,
Line 25, "our" should read -- or --.
Line 65, "unit." should read -- unit --.

Column 8,
Line 48, "7." should read -- 7 --.
Line 64, "realizeythe" should read -- realize the --.

Signed and Sealed this

Thirtieth Day of September, 2003

JAMES E. ROGAN
*Director of the United States Patent and Trademark Office*